(12) United States Patent
Matsunawa

(10) Patent No.: US 12,716,752 B2
(45) Date of Patent: Aug. 25, 2026

(54) RESOLVER

(71) Applicant: MABUCHI MOTOR CO., LTD., Chiba (JP)

(72) Inventor: Akira Matsunawa, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 221 days.

(21) Appl. No.: 18/764,383

(22) Filed: Jul. 5, 2024

(65) Prior Publication Data

US 2024/0361153 A1 Oct. 31, 2024

Related U.S. Application Data

(63) Continuation of application No. 18/256,210, filed as application No. PCT/JP2021/045685 on Dec. 10, 2021, now abandoned.

(30) Foreign Application Priority Data

Dec. 11, 2020 (JP) ................................ 2020-205913

(51) Int. Cl.
*G01D 5/20* (2006.01)
*G01B 7/30* (2006.01)

(52) U.S. Cl.
CPC ................ *G01D 5/20* (2013.01); *G01B 7/30* (2013.01)

(58) Field of Classification Search
CPC ...... G01D 5/20; G01D 5/2006; G01D 5/2013; G01D 5/202; G01D 5/2026; G01D 5/204; G01D 5/2046; G01D 5/2053; G01D 5/206; G01D 5/208; G01D 5/2086; G01D 5/2093; G01B 7/30
See application file for complete search history.

(56) References Cited

U.S. PATENT DOCUMENTS

2010/0244816 A1 9/2010 Nakamura
2010/0321007 A1 12/2010 Fukuda et al.
(Continued)

FOREIGN PATENT DOCUMENTS

CN 101853735 A 10/2010
CN 102055295 A 5/2011
(Continued)

OTHER PUBLICATIONS

International Search Report in PCT Application No. PCT/JP2021/045685 mailed Jan. 25, 2022, 5pp.
(Continued)

*Primary Examiner* — David M Schindler
(74) *Attorney, Agent, or Firm* — HAUPTMAN HAM, LLP

(57) ABSTRACT

A resolver includes excitation coils and a detection coil. One of the excitation coils and the detection coil includes a sine coil and a cosine coil that transmit AC signals having phases of the electrical angle different from each other by 90 degrees. Further, the other coil is provided with an annular magnetic pole group in which a plurality of magnetic poles is disposed adjacent to each other in the circumferential direction at a facing face at which the rotor and the stator face each other. The plurality of sine coils and the plurality of the cosine coils are alternately disposed adjacent to each other in the circumferential direction at the facing face. The circumferential intervals between the magnetic poles included in the excitation coils and the detection coil are identical.

15 Claims, 8 Drawing Sheets

(56) References Cited

U.S. PATENT DOCUMENTS

| | | | |
|---|---|---|---|
| 2011/0109304 | A1 | 5/2011 | Suzuki et al. |
| 2012/0274316 | A1 | 11/2012 | Matsuura et al. |
| 2022/0205813 | A1 | 6/2022 | Shimahara |
| 2022/0252430 | A1 | 8/2022 | Urahama et al. |
| 2022/0291022 | A1 | 9/2022 | Shimahara |

FOREIGN PATENT DOCUMENTS

| | | | |
|---|---|---|---|
| CN | 108917796 | A | 11/2018 |
| DE | 102010013257 | A1 | 10/2010 |
| JP | H05149757 | A | 6/1993 |
| JP | 2010237077 | A | 10/2010 |
| JP | 2010249743 | A | 11/2010 |
| JP | 5203301 | B2 | 6/2013 |
| JP | 6749027 | B1 | 9/2020 |
| WO | 2021038967 | A1 | 3/2021 |

OTHER PUBLICATIONS

Office Action in CN Application No. 202180082218.4 dated Oct. 14, 2023, 13pp.
Office Action in CN Application No. 202180082218.4 mailed Mar. 6, 2024, 16pp.
Written Opinion in PCT Application No. PCT/JP2021/045685 mailed Jan. 25, 2022, 7pp.

13A

13B

Fig.8
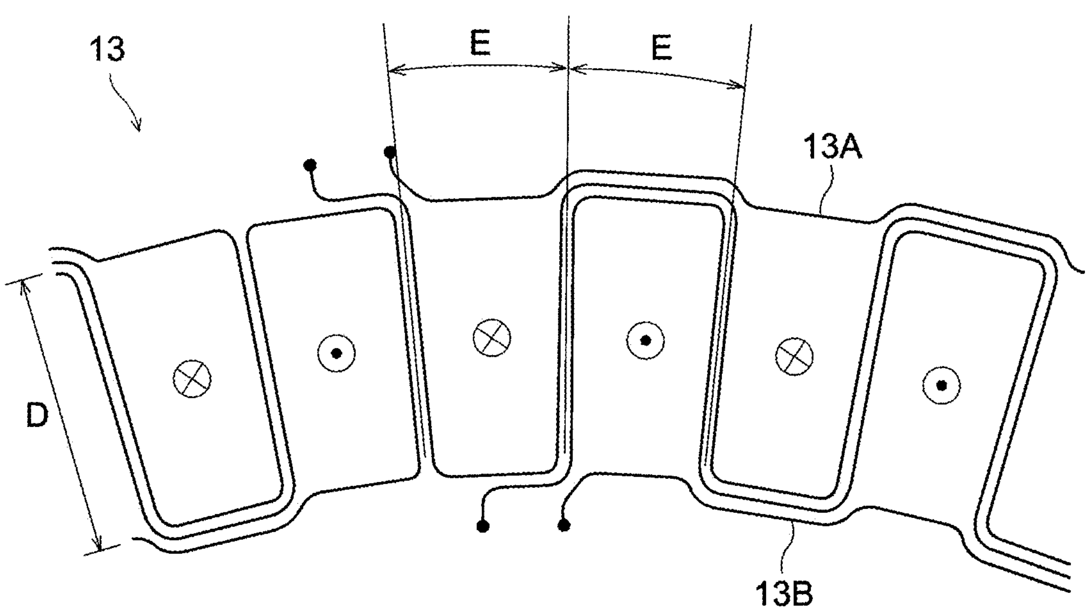
Fig. 9A
Fig. 9B
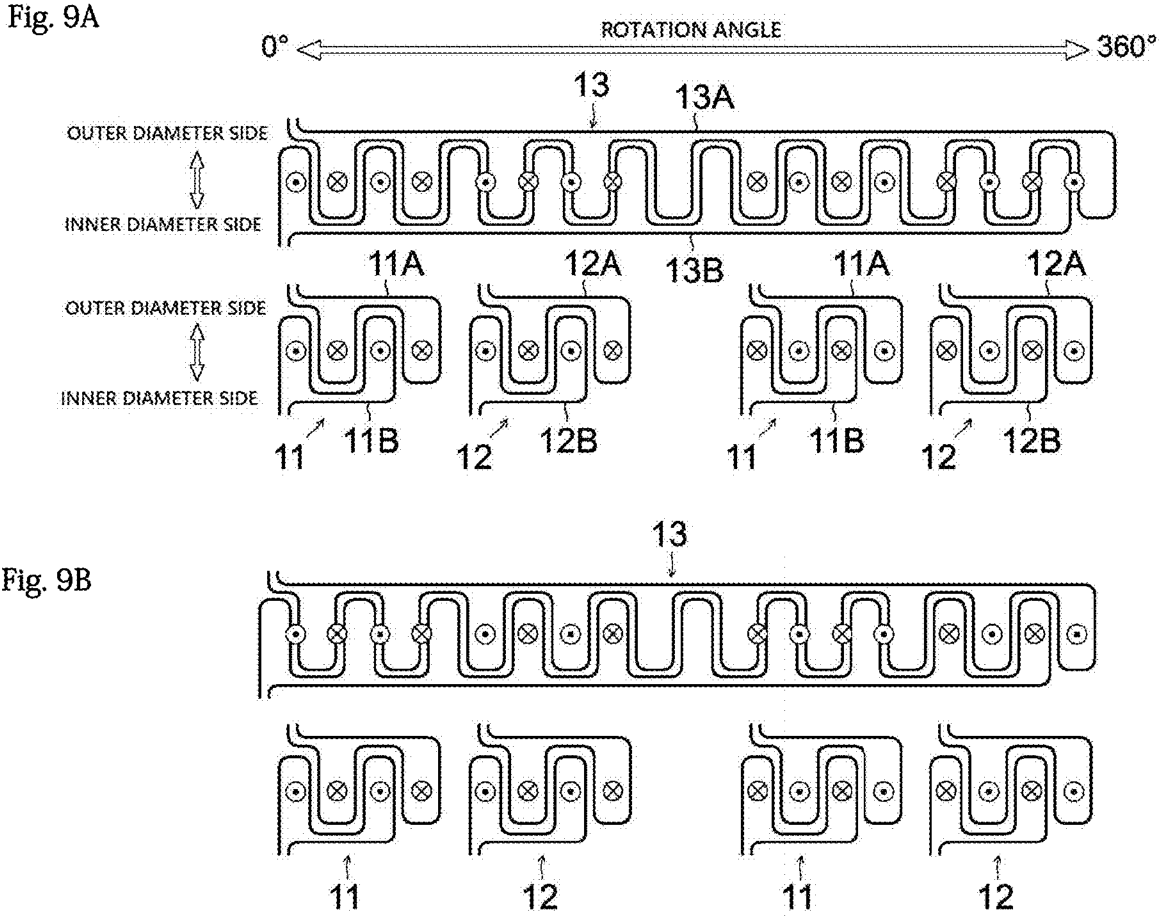

RESOLVER

RELATED APPLICATIONS

The present application is a continuation of U.S. patent application Ser. No. 18/256,210 filed on Jun. 7, 2023, which is the National Phase of International Application Number PCT/JP2021/045685 filed Dec. 10, 2021, which claims the benefit of priority from Japanese Patent Application No. 2020-205913, filed on Dec. 11, 2020. The disclosures of which applications are hereby incorporated by reference herein in their entirety.

TECHNICAL FIELD

The present invention relates to a resolver that detects a rotation angle of a rotor with respect to a stator.

BACKGROUND ART

In the related art, in a resolver that detects a rotation angle of a rotor with respect to a stator, there is known a structure in which two-phase sheet coils having a phase difference of 90 degrees in an electrical angle are disposed adjacent to each other in a circumferential direction. For example, a resolver having a structure in which two-phase detection coils (sin phase coil pattern, cos phase coil pattern) disposed to face a single-phase excitation coil are disposed on the identical plane is known. With such a structure, the distances of the two-phase detection coils to the excitation coil are substantially identical, and the angle detection accuracy can be improved (see Japanese Patent No. 5203301).

CITATION LIST

Patent Literature

Patent Literature 1: Japanese Patent No. 5203301

SUMMARY OF INVENTION

Technical Problem

In the technique described in Japanese Patent No. 5203301, the interval on the excitation coil side is different from the interval on the detection coil side in the circumferential direction between the magnetic poles. For example, each of the resolver rotor coils 216 and 217 (excitation coil) in the technique described in Japanese Patent No. 5203301 is disposed in a region obtained by dividing an annular region into eight equal sections. On the other hand, each of the resolver stator coils 236 and 237 (detection coil) is disposed in a region obtained by dividing the annular region into 16 equal sections. That is, the magnetic flux generated by the energization to resolver rotor coils 216 and 217 is always distributed in a wider range than the region effective for generating the induced voltage on the resolver stator coils 236 and 237 side. Therefore, for example, the peak shape of the sine wave is gentle, the peak of the output signal decreases, and a desired sine wave cannot be acquired, and the angle information cannot be accurately determined. Such a phenomenon is one of factors that deteriorate the detection performance of the rotation angle, such as an increase in angle error. Even when the size of the region where the excitation coil is disposed and the size of the region where the detection coil is disposed are exchanged, a similar problem may occur.

One object of the present invention is to provide a resolver that has been created in view of the above problems and can improve detection performance of a rotation angle with a simple configuration. It is to be noted that the present invention is not limited to this object, and it is another object of the present invention to achieve operational effects that are derived from each configuration illustrated in "Mode for Carrying Out the Invention" to be described later and cannot be obtained by conventional techniques.

Solution to Problem

A resolver according to the present disclosure detects a rotation angle of a rotor with respect to a stator, the resolver including a sheet-like excitation coil provided at the rotor or the stator, and a sheet-like detection coil provided at the rotor or the stator, wherein one of the excitation coil and the detection coil includes a plurality of sine coils and a plurality of cosine coils that transmit AC signals having phases of an electrical angle different from each other by 90 degrees. The other of the excitation coil and the detection coil has an annular magnetic pole group in which a plurality of magnetic poles is disposed adjacent to each other in the circumferential direction at a facing face at which the rotor and the stator face each other. The plurality of sine coils and the plurality of cosine coils are alternately disposed adjacent to each other in the circumferential direction at the facing face. Intervals in a circumferential direction between magnetic poles included in each of the excitation coil and the detection coil are identical.

Advantageous Effects of Invention

According to the resolver of the disclosure, the detection performance of the rotation angle can be improved with the simple configuration.

BRIEF DESCRIPTION OF DRAWINGS

FIG. 8 is a wiring diagram of a detection coil.

FIGS. 9A and 9B are schematic diagrams illustrating a correspondence relationship between a detection coil and an excitation coil.

DESCRIPTION OF EMBODIMENTS

1. First Embodiment

[A. Configuration]

Figure 1:
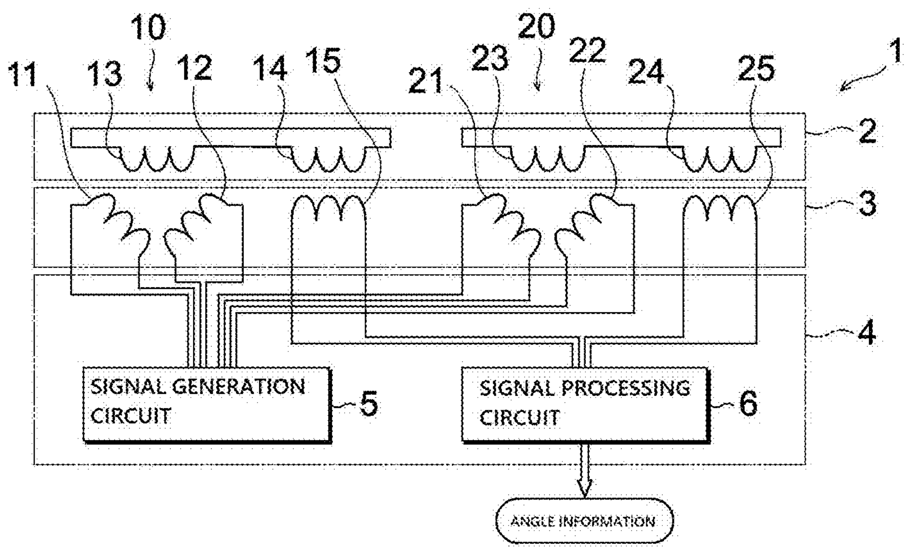
FIG. 1 is a schematic diagram illustrating a structure of a resolver as the first embodiment.
Figure 2:
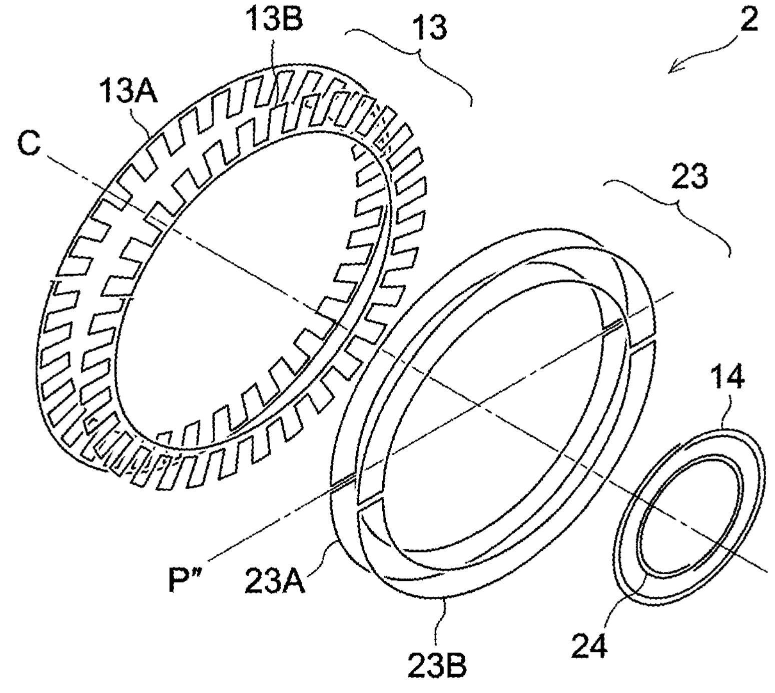
FIG. 2 is an exploded perspective view illustrating a structure of a rotor of the resolver illustrated in FIG. 1.
Figure 3:
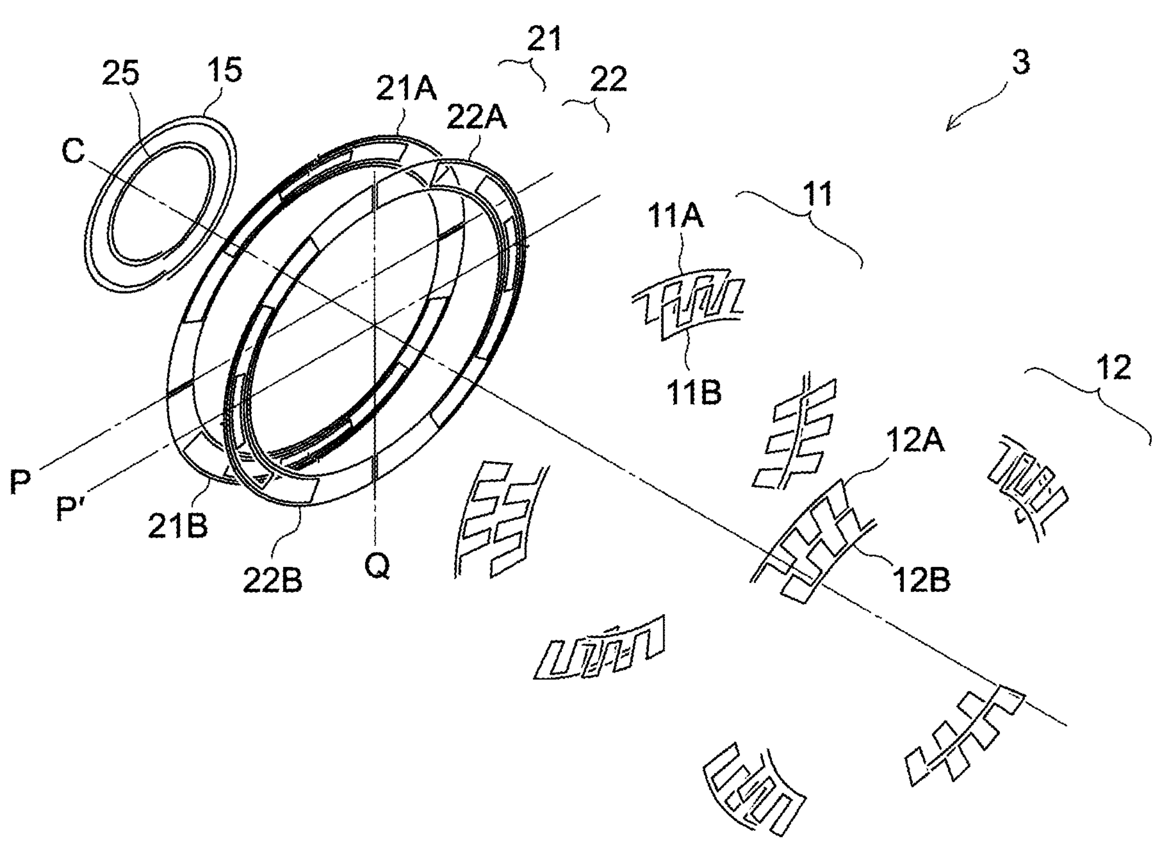
FIG. 3 is an exploded perspective view illustrating a structure of a stator of the resolver illustrated in FIG. 1.

FIG. 1 is a schematic diagram illustrating a structure of a resolver 1 according to the first embodiment. The resolver 1 is a two-phase excitation single-phase output resolver 1, and is a modulated wave resolver that receives an amplitude-modulated AC signal and detects a rotation angle from a phase-modulated signal using the amplitude-modulated AC signal. The resolver 1 includes a rotor 2 (rotor), a stator 3 (stator), and a control device 4. The rotor 2 is a disk-shaped member rotatably supported by the stator 3. The stator 3 is a disk-shaped member fixed to a casing (not illustrated). FIG. 2 is an exploded perspective view illustrating a structure of the rotor 2, and FIG. 3 is an exploded perspective view illustrating a structure of the stator 3. As illustrated in FIGS. 2 and 3, each of the rotor 2 and the stator 3 is provided with a plurality of sheet coils formed in a sheet shape.

The control device 4 calculates and outputs a rotation angle of the rotor 2 with respect to the stator 3. The control device 4 includes a signal generation circuit 5 that generates an AC signal supplied to the sheet coil, and a signal processing circuit 6 that outputs angle information corresponding to a rotation angle based on an output signal returned from the sheet coil. The AC signal generated by the signal generation circuit 5 is transmitted from the stator 3 side to the rotor 2 side by electromagnetic induction, then returned from the rotor 2 side to the stator 3 side, and input to the signal processing circuit 6.

The rotor 2 and the stator 3 of the resolver 1 illustrated in FIG. 1 are provided with a first coil group 10 and a second coil group 20. The first coil group 10 is a coil group including an excitation coil and a detection coil having an axial double angle of nX. In other words, the excitation coil and the detection coil of the first coil group 10 are multipolar coils, and n pairs of magnetic poles (N pole and S pole) are formed. The excitation coil and the detection coil of the first coil group 10 are disposed coaxially with a rotation axis C of the rotor 2, and each of the excitation coil and the detection coil is formed in an annular shape. Since the current flowing through the coil of the resolver 1 is an alternating current, the polarity (N pole, S pole) of the magnetic pole pair is inverted at a frequency corresponding to the frequency of the alternating current. Therefore, the polarity of the magnetic pole pair is not constantly fixed. In other words, there are a portion that functions as an N pole and a portion that functions as an S pole at a certain moment, and the polarity of each portion varies with time.

On the other hand, the second coil group 20 is a coil group including an excitation coil and a detection coil having an axial double angle of 1X. The excitation coil and the detection coil of the second coil group 20 are disposed coaxially with the rotation axis C of the rotor 2, and each of the excitation coil and the detection coil is formed in an annular shape. The first coil group 10 and the second coil group 20 are provided at different positions in the radial direction. The excitation coil and the detection coil of the second coil group 20 are also multipolar coils, but the number of pairs of magnetic poles (N pole and S pole) is one. The value of n representing the axial double angle may be any natural number of 2 or more, and the angular resolution is improved as the value of n is larger.

The first coil group 10 includes a first sine excitation coil 11, a first cosine excitation coil 12, a first detection coil 13, a first transmission antenna coil 14, and a first reception antenna coil 15. Among these coils 11 to 15, axial double angles of at least the first sine excitation coil 11, the first cosine excitation coil 12, and the first detection coil 13 are set to nX. As illustrated in FIG. 1, the first sine excitation coil 11, the first cosine excitation coil 12, and the first reception antenna coil 15 are provided at the stator 3. The first detection coil 13 and the first transmission antenna coil 14 are provided at the rotor 2.

The first sine excitation coil 11 and the first cosine excitation coil 12 are sheet-like coils for inducing a voltage (voltage corresponding to the rotor angle) to the first detection coil 13 of the rotor 2. When it is not necessary to distinguish them, they may be collectively referred to as first excitation coils 11, 12. AC signals having phases of the electrical angle different from each other by 90 degrees are input to each of the first excitation coils 11, 12. The AC signal is generated by the signal generation circuit 5 and then supplied to each of the first sine excitation coil 11 and the first cosine excitation coil 12. Specific examples of the AC signal include a modulated wave modulated so as to periodically increase or decrease the amplitude of a high frequency signal of several tens of kilohertz to several megahertz.

Figure 4:
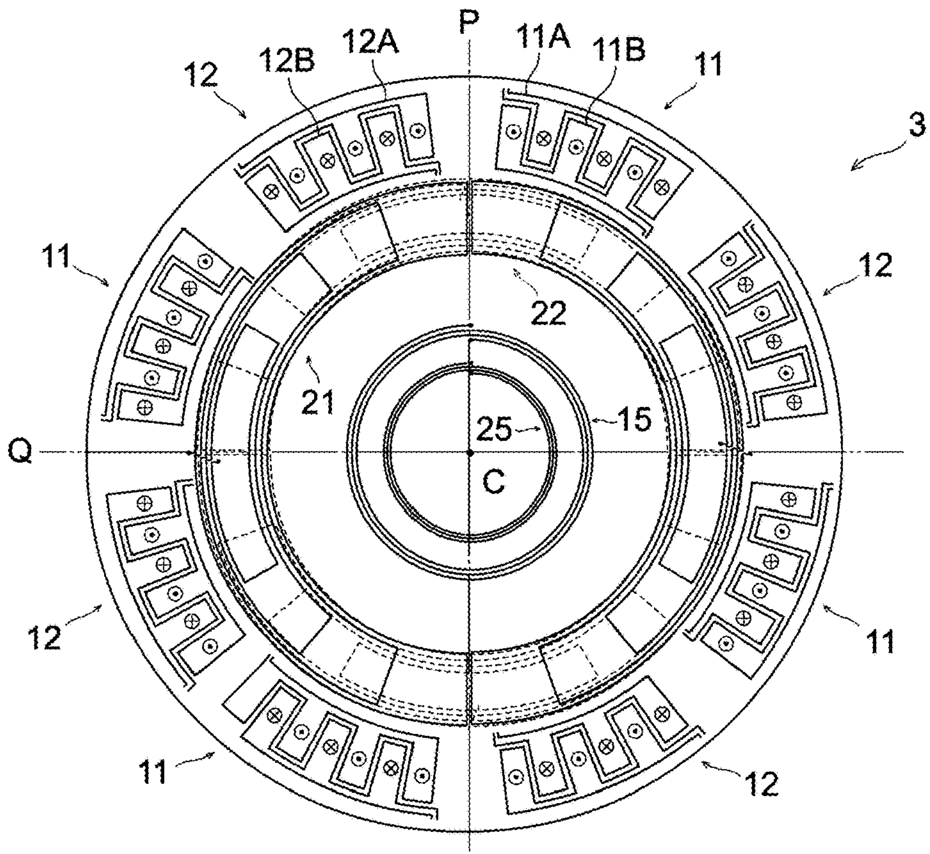
FIG. 4 is a front view of the stator illustrated in FIG. 1.
Figure 5:
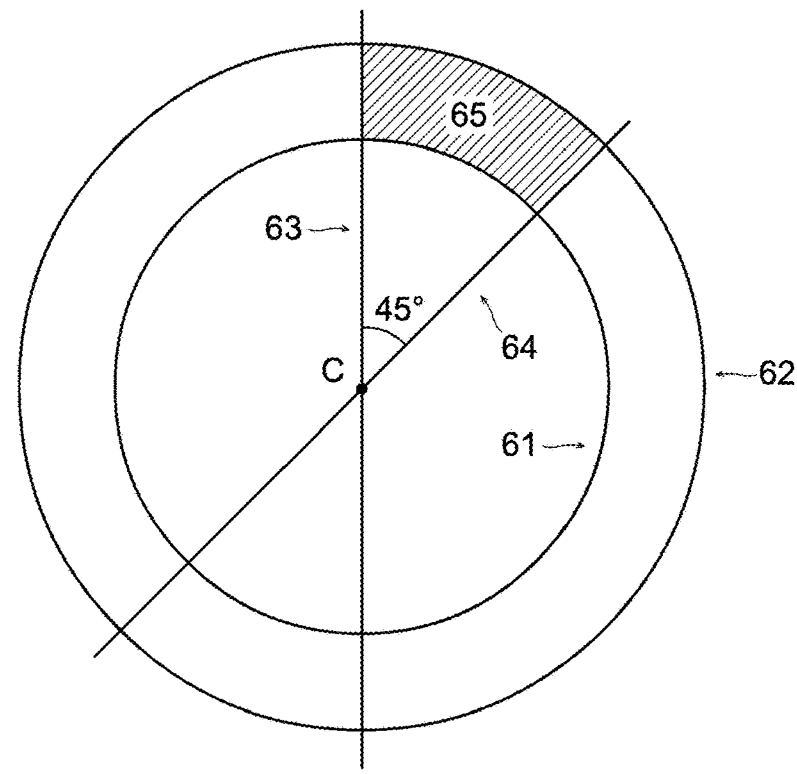
FIG. 5 is a schematic view for explaining a partial annular region.

As illustrated in FIGS. 3 and 4, the first sine excitation coil 11 and the first cosine excitation coil 12 are disposed so as to be alternately adjacent to each other in the circumferential direction at the facing face, of the stator 3, facing the rotor 2. The shape of the region where each of the first sine excitation coil 11 and the first cosine excitation coil 12 is disposed is a shape corresponding to a partial annular region 65 as illustrated in FIG. 5. The partial annular region 65 is a region surrounded by an inner circle 61 and an outer circle 62 centered on the rotation axis C of the rotor 2 and two straight lines 63 and 64 passing through the rotation axis C. In the example illustrated in FIG. 5, the angle formed by the two straight lines 63 and 64 is 45 degrees, and it is possible to arrange eight partial annular regions 65 adjacent to each other in the circumferential direction. When it is desired to arrange the m partial annular regions 65 adjacent to each other, the angle formed by the two straight lines 63 and 64 may be set to 360 degrees/m.

In the first embodiment, the first sine excitation coil 11 and the first cosine excitation coil 12 are alternately disposed adjacent to each other in respective regions obtained by equally dividing the facing face at which the rotor 2 and the stator 3 face each other into an even number (eight in FIG. 4). As a result, the number of the first sine excitation coils 11 and the number of the first cosine excitation coils 12 are identical. The first sine excitation coil 11 and the first cosine excitation coil 12 are routed so as to form a rotationally symmetric shape with respect to the rotation axis C of the rotor 2 on the identical plane. In the example illustrated in FIG. 4, with the first sine excitation coil 11 and the first cosine excitation coil 12 as one set, four sets are disposed to form a rotationally symmetric shape.

The number of pairs (the number of sets) of the first sine excitation coil 11 and the first cosine excitation coil 12 will be supplementarily described. In a case where the number of sets is set to one set or two sets, the balance between the left half face and the right half face tends to deteriorate in the annular region where the first excitation coils 11, 12 are disposed in FIG. 4, and the robustness as a detector decreases. Therefore, the number of sets is preferably three or more. When the number of sets is set to an odd number, the number of the first sine excitation coils 11 and the number of the first cosine excitation coils 12 are different in the left half face and the right half face. Therefore, more preferably, the number of sets is an even number. However, when the number of sets is excessively increased, a large space is taken up in the gap between the first excitation coils 11, 12 illustrated in FIG. 4, which is disadvantageous particularly in the resolver 1 having a small diameter. In consideration of these points, the number of sets of the first sine excitation coil 11 and the first cosine excitation coil 12 illustrated in FIG. 4 is set to four.

The first sine excitation coil 11 and the first cosine excitation coil 12 may be shifted to positions where the phases of the electrical angle are identical. For example, the first excitation coils 11, 12 may be shifted to a position different from the rotationally symmetric position by 360 degrees in the electrical angle (that is, a mechanical angle for one pole pair) in the circumferential direction. As described above, by moving the positions of the first excitation coils 11, 12 by N cycles in the electrical angle in the circumferential direction (Specifically, moving by one cycle or two cycles in the electrical angle), the gap between the first excitation coils 11, 12 can be widened, and the lead wire from the inner peripheral side can be easily routed in the identical plane through the gap. The dimension of the gap is set to at least a dimension corresponding to 180 degrees (that is, a mechanical angle corresponding to 0.5 pole pair, which is one magnetic pole) in the electrical angle or more. Therefore, the first cosine coil 12 adjacent to the first sine excitation coil 11 adjacent to the wide gap is provided at a position different by N cycles±90 degrees (¼ cycles) in the electrical angle in the circumferential direction. The first sine excitation coil 11 and the first cosine excitation coil 12 are positionally shifted by N cycles±90 degrees, and the electrical signals input thereto are also shifted by +90 degrees (cos: +90 degrees for sin, and sin: −90 degrees for cos). As a result, the following signals are obtained.

$$\sin(wt+\theta)=\sin wt\cdot\cos\theta+\cos wt\cdot\sin\theta$$

(Signal)(Position)(Signal)(Position)

In addition, the circumferential length of the first excitation coils 11, 12 included in one partial annular region 65 as illustrated in FIG. 5 may be any length in which one magnetic pole pair (N pole and S pole) can be formed at minimum. When the number of partial annular regions 65 is m, the number of sets of the first sine excitation coil 11 and the first cosine excitation coil 12 can be expressed as m/2. Therefore, the number of magnetic pole pairs included in one set of first excitation coils 11, 12 is the number (2 n/m) obtained by dividing the value n of the axial double angle by the number of sets at the maximum, and one at the minimum.

Figures 6, 7A, 7B:
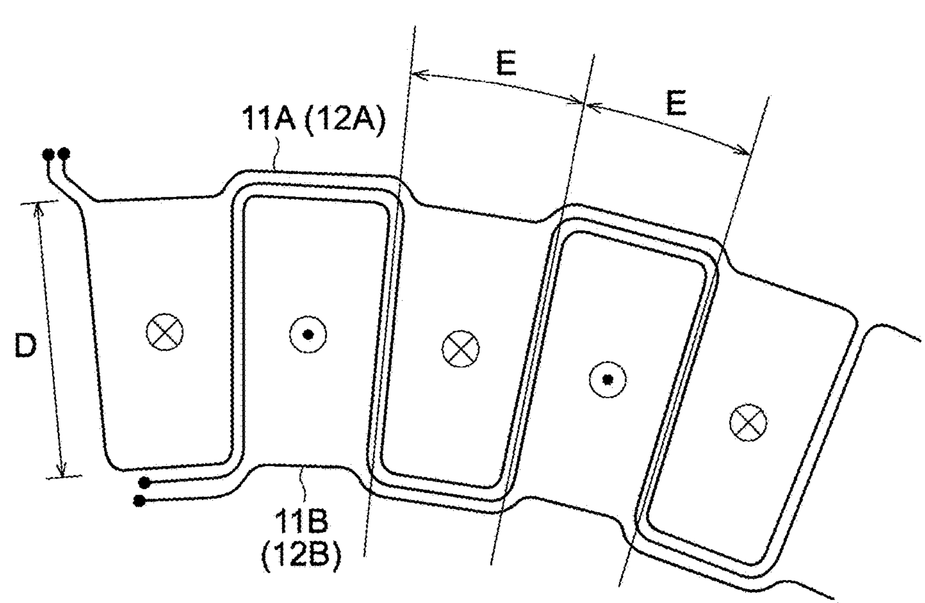
FIG. 6 is a wiring diagram of an excitation coil.
FIGS. 7A and 7B are schematic diagrams illustrating a structure of a detection coil.

As illustrated in FIG. 6, the first sine excitation coil 11 is formed in a shape in which an outward coil 11A (first comb-shaped closed coil) for generating one of the magnetic pole pair (N pole and S pole) and a backward coil 11B (second comb-shaped closed coil) for generating the other of the magnetic pole pair are linked. The outward coil 11A and the backward coil 11B are disposed on the identical plane so as not to overlap each other in the partial annular region 65 as illustrated in FIG. 5. The outward coil 11A is configured by a coil at least partially having a corrugated shape.

The "corrugated shape" as used herein includes a repetitive shape in which a radial distance changes at a constant cycle with respect to a change in deflection angle on a polar coordinate plane perpendicular to the rotation axis C of the rotor 2 and having the rotation axis C as an origin. In addition, a shape imitating the repetitive shape and a shape similar to the repetitive shape are included. For example, a shape that is not completely identical to the repetitive shape but is obtained by deforming the repetitive shape to such an extent that the performance of the resolver 1 is not degraded, or a shape substantially equivalent to the repetitive shape is included in the "corrugated shape" referred to herein. As a specific example, the "wave shape" includes a rectangular corrugated shape, a sinusoidal wave shape, and a triangular wave shape. In addition, a wave shape in which a corner of each of these shapes is removed (a shape in which a corner of a rectangle or a triangle is rounded and blunted) is also included.

The outward coil 11A illustrated in FIG. 6 is formed in a shape in which a rectangular wave is disposed along the circumference of a circle coaxial with the rotation axis C of the rotor 2 and a conductor is routed along the outer peripheral side of the rectangular wave. In other words, it is formed in a shape in which the conductor is routed so as to form the outline of the gear disposed coaxially with the rotation axis C of the rotor 2 and the conductor is routed along the outer peripheral side of the gear. In other words, the outward coil 11A is formed in an inward tooth comb shape, and is formed in a shape in which the conductor is routed so as to form an outline of a comb having teeth extending from the arc of the outer circle 62 toward the arc of the inner circle 61 illustrated in FIG. 5.

On the other hand, the backward coil 11B is formed in a shape in which a rectangular wave is disposed along the circumference of a circle coaxial with the rotation axis C of the rotor 2 and a conductor is routed along the inner peripheral side of the rectangular wave. In other words, it is formed in a shape in which the conductor is routed so as to form the outline of the gear disposed coaxially with the rotation axis C of the rotor 2 and the conductor is routed along the inner peripheral side of the gear. In other words, the backward coil 11B is formed in an outward tooth comb shape, and is formed in a shape in which the conductor is routed so as to form an outline of a comb having teeth extending from the arc of the inner circle 61 toward the arc of the outer circle 62 illustrated in FIG. 5. By combining the outward coil 11A and the backward coil 11B so as not to overlap each other, for example, in the identical plane, a magnetic pole pair (N pole and S pole) adjacent in the circumferential direction is formed as illustrated in FIG. 6.

As in the first sine excitation coil 11, a first cosine excitation coil 12 is formed in a shape in which the outward coil 12A (first comb-shaped closed coil) and a backward coil 12B (second comb-shaped closed coil) are linked so as not to overlap each other. As illustrated in FIG. 6, the outward coil 12A is formed in a shape in which the conductor is routed so as to form an outline of a comb having teeth extending inward from an arc. In addition, the backward coil 12B is formed in a shape in which the conductor is routed so as to form an outline of a comb having teeth extending outward from an arc. By combining the outward coil 12A and the backward coil 12B so as not to overlap each other, for example, in the identical plane, a magnetic pole pair (N pole and S pole) adjacent in the circumferential direction is formed as illustrated in FIG. 6.

The magnetic pole structure of each of the first sine excitation coil 11 and the first cosine excitation coil 12 included in one partial annular region 65 will be described in detail. In one first sine excitation coil 11, the intervals in the circumferential direction between the magnetic poles included in the outward coil 11A and the backward coil 11B are identical, and the area per pole of the magnetic pole pair is also identical. Similarly, in one first cosine excitation coil 12, the intervals in the circumferential direction between the magnetic poles included in the outward coil 12A and the backward coil 12B are identical, and the area per pole of the magnetic pole pair is also identical.

The circumferential interval between the magnetic poles of the first sine excitation coil 11 is identical to the circumferential interval between the magnetic poles of the first cosine excitation coil 12. Furthermore, the area per pole of the magnetic pole pair of the first sine excitation coil 11 is identical to the area per pole of the magnetic pole pair of the first cosine excitation coil 12. As illustrated in FIG. 6, the radial dimension D of the magnetic pole is identical between the adjacent magnetic poles, and is also identical between the first sine excitation coil 11 and the first cosine excitation coil 12. The angle E corresponding to the width of the magnetic pole with respect to the rotation axis C of the rotor 2 is also identical between the adjacent magnetic poles, and is also identical between the first sine excitation coil 11 and the first cosine excitation coil 12.

The first detection coil 13 (detection coil) is disposed at a position facing the first sine excitation coil 11 and the first cosine excitation coil 12 in the axial direction of the rotor 2 at the facing face at which the rotor 2 and the stator 3 face each other. The first detection coil 13 has an annular magnetic pole group in which a plurality of magnetic poles is disposed adjacent to each other in the circumferential direction. In other words, the magnetic pole group of the first detection coil 13 is continuously provided so as to surround the entire circumference of the rotation axis C by 360 degrees about the rotation axis C of the rotor 2. As illustrated in FIG. 2, the first detection coil 13 is formed in a shape in which an outward coil 13A and a backward coil 13B are linked. The outward coil 13A and the backward coil 13B are disposed so as not to overlap each other in an annular region.

The outward coil 13A is formed in a shape in which a rectangular wave is disposed along the circumference of a circle coaxial with the rotation axis C of the rotor 2 and a conductor is routed along the outer peripheral side of the rectangular wave. In other words, it is formed in a shape in which the conductor is routed so as to form the outline of the gear disposed coaxially with the rotation axis C of the rotor 2 and the conductor is routed along the outer peripheral side of the gear. As illustrated in FIG. 7A, the outward coil 13A is formed in a shape in which the conductor is routed so as to form an outline of a comb having teeth extending toward the inside of a circle.

The backward coil 13B is formed in a shape in which a rectangular wave is disposed along the circumference of a circle coaxial with the rotation axis C of the rotor 2 and a conductor is routed along the inner peripheral side of the rectangular wave. In other words, it is formed in a shape in which the conductor is routed so as to form the outline of the gear disposed coaxially with the rotation axis C of the rotor 2 and the conductor is routed along the inner peripheral side of the gear. As illustrated in FIG. 7B, the backward coil 13B is formed in a shape in which the conductor is routed so as to form an outline of a comb having teeth extending toward the outside of a circle. By combining the outward coil 13A and the backward coil 13B so as not to overlap each other, for example, in the identical plane, n magnetic pole pairs (N pole and S pole) adjacent in the circumferential direction are formed.

In the first detection coil 13, the intervals in the circumferential direction between the magnetic poles included in the outward coil 13A and the backward coil 13B are identical, and the area per pole of the magnetic pole pair is also identical. In addition, the interval in the circumferential direction between the magnetic poles in the first detection coil 13 is identical to the interval in the circumferential direction between the magnetic poles in the first excitation coils 11, 12, and the area per pole of the magnetic pole pair is also identical. For example, as illustrated in FIG. 8, the radial dimension D of the magnetic pole is identical between adjacent magnetic poles, and is identical between the first excitation coils 11, 12 and the first detection coil 13. The angle E corresponding to the width of the magnetic pole with respect to the rotation axis C of the rotor 2 is identical between the adjacent magnetic poles, and is identical between the first excitation coils 11, 12 and the first detection coil 13.

FIGS. 9A and 9B are schematic diagrams for explaining the relationship between the first excitation coils 11, 12 and the first detection coil 13. Actually, the number of each of the first sine excitation coils 11 and the first cosine excitation coils 12 is four as illustrated in FIG. 4, but this is omitted and two are illustrated in FIGS. 9A and 9B. The horizontal direction in the figure corresponds to a rotation angle (deflection angle) direction, and the vertical direction in the figure corresponds to a radial direction (upper side is the outer diameter side, and lower side is the inner diameter side).

The first sine excitation coil 11 and the first cosine excitation coil 12 include the identical number of rotationally symmetric coils in which the directions of the magnetic fluxes caused by the excitation are different from each other on the premise that the phases of the coils 11 and 12 coincide with each other based on the magnetic pole pitch of the rotor 2. For example, focusing on the first sine excitation coil 11 on the left side in FIG. 9A, it is assumed that the direction of the magnetic flux generated by exciting the outward coil 11A at a certain moment is a direction from near to the viewer to far from the viewer. On the other hand, with respect to the outward coil 11A in the first sine excitation coil 11 on the right side in FIG. 9A, the direction of the magnetic flux generated by exciting the outward coil 11A at a certain moment is formed to be a direction from far from the viewer to near to the viewer. That is, the outward coil 11A of the first sine excitation coil 11 has a rotationally symmetric shape, and is formed such that directions of magnetic fluxes generated by excitation are different from each other.

The same applies to the backward coil 11B of the first sine excitation coil 11, and the backward coil 11B in the first sine excitation coil 11 on the left side in FIG. 9A generates a magnetic flux in a direction from far from the viewer to near to the viewer at a certain moment. On the other hand, the backward coil 11B in the first sine excitation coil 11 on the right side in FIG. 9A generates a magnetic flux in a direction from near to the viewer to far from the viewer at a certain moment. When the magnetic flux generated by the first sine excitation coil 11 is superimposed on the first detection coil 13, the difference between the magnetic field acting on the outward coil 13A and the magnetic field acting on the backward coil 13B decreases. Therefore, the magnetic flux differences due to the coil shapes (comb directions) in the identical phase are averaged, and the angle detection accuracy of the resolver 1 is further improved.

FIG. 9B is a schematic diagram illustrating a state in which the rotor 2 rotates by 90° in an electrical angle from the state illustrated in FIG. 9A. Not only the first sine excitation coil 11 but also the first cosine excitation coil 12 includes the identical number of rotationally symmetric coils in which the directions of the magnetic fluxes caused by the excitation are different from each other. With this structure, the difference between the magnetic field acting on the outward coil 13A and the magnetic field acting on the backward coil 13B in the magnetic field generated by the first cosine excitation coil 12 is reduced, and the magnetic flux difference due to the coil shape (comb direction) is averaged. Accordingly, the angle detection accuracy of the resolver 1 is further improved.

The first transmission antenna coil 14 is a winding (coil) for returning an AC signal generated in the first detection coil 13 to the stator 3 side, and is provided at the rotor 2. As illustrated in FIG. 2, the first transmission antenna coil 14 has a closed circuit with both ends thereof connected to both ends of the first detection coil 13. In addition, the first transmission antenna coil 14 illustrated in FIG. 2 is formed in a shape in which the conductor is routed so as to spiral around the rotation axis C of the rotor 2 inside the first detection coil 13. The specific shape of the first transmission antenna coil 14 is not limited to that illustrated in FIG. 2, and a known antenna shape can be applied.

The first reception antenna coil 15 is provided at the stator 3 and is disposed at a position facing the first transmission antenna coil 14 in the axial direction of the rotor 2. The first reception antenna coil 15 illustrated in FIG. 3 is formed in a shape in which the conductor is routed so as to spiral around the rotation axis C of the rotor 2 inside the first sine excitation coil 11. The AC signal transmitted to the first reception antenna coil 15 is input to the signal processing circuit 6 and used for calculating the rotation angle of the rotor 2 with respect to the stator 3. Note that the specific shape of the first reception antenna coil 15 is not limited to that illustrated in FIG. 3, and a known antenna shape can be applied.

The configuration of the second coil group 20 is substantially identical to that of the first coil group 10 except for characteristics related to the axial double angle. The second coil group 20 includes a second sine excitation coil 21, a second cosine excitation coil 22, a second detection coil 23, a second transmission antenna coil 24, and a second reception antenna coil 25. Among these coils 21 to 25, the axial double angle of at least the second sine excitation coil 21, the second cosine excitation coil 22, and the second detection coil 23 is set to 1×. As illustrated in FIG. 1, the second sine excitation coil 21, the second cosine excitation coil 22, and the second reception antenna coil 25 are provided at the stator 3. The second detection coil 23 and the second transmission antenna coil 24 are provided at the rotor 2.

The second sine excitation coil 21 and the second cosine excitation coil 22 are coils for exciting the second detection coil 23 of the rotor 2. When it is not necessary to distinguish them, they may be collectively referred to as second excitation coils 21, 22. As in the first excitation coils 11, 12, AC signals (AC signals generated by the signal generation circuit 5) having phases of the electrical angle different from each other by 90 degrees are input to the second excitation coils 21, 22.

As illustrated in FIG. 3, the second sine excitation coil 21 is formed in a shape in which an outward coil 21A and a backward coil 21B are linked. For example, the outward coil 21A is formed in a shape in which the conductor is spirally routed in one of the two sections obtained by dividing the annular region into two by an any straight line P passing through the rotation axis C of the rotor 2 on a plane in which the second sine excitation coil 21 is routed. In addition, the backward coil 21B is formed in a shape in which the conductor is spirally routed in the other of the two sections obtained by dividing the annular region into two by the straight line P. The outward coil 21A functions to generate one of the magnetic pole pair and the backward coil 21B functions to generate the other of the pole pair.

Similarly, the second cosine excitation coil 22 is formed in a shape in which an outward coil 22A and a backward coil 22B are linked. Here, a straight line P' parallel to the straight line P is assumed on the plane in which the second cosine excitation coil 22 is routed. The outward coil 22A is formed in a shape in which the conductor is spirally routed in one of the two sections obtained by dividing the annular region into two by a straight line Q passing through the rotation axis C of the rotor 2 and orthogonal to the straight line P' on a plane in which the second cosine excitation coil 22 is routed. In addition, the backward coil 22B is formed in a shape in which the conductor is spirally routed in the other of the two sections obtained by dividing the annular region into two by the straight line Q. The outward coil 22A functions to generate one of the magnetic pole pair and the backward coil 22B functions to generate the other of the pole pair. The position of the magnetic pole pair on the second cosine excitation coil 22 side is set to a position different from the position of the magnetic pole pair on the second sine excitation coil 21 side. For example, the magnetic pole pair on the second cosine excitation coil 22 side is disposed at a position by shifting by 90 degrees the position of the magnetic pole pair on the second sine excitation coil 21 side with respect to the rotation axis C.

The number of turns of each of the second sine excitation coil 21 and the second cosine excitation coil 22 is set to change stepwise as the deflection angle is changed in a polar coordinate plane perpendicular to the rotation axis C of the rotor 2 and having the rotation axis C as an origin. In the example illustrated in FIG. 4, the winding shape of the coil is set such that the number of turns is 0 when the deflection angle is 90 degrees (12:00 direction at the clock position) and 270 degrees (6:00 direction), and the number of turns is maximized when the deflection angle is 0 degrees (3:00 direction) and 180 degrees (9:00 direction). The magnitude of the deflection angle at which the number of turns is maximized is set to be different by 90 degrees between the second sine excitation coil 21 and the second cosine excitation coil 22. For example, when the deflection angles at which the number of turns of the second sine excitation coil 21 is maximized are 90 degrees and 270 degrees, the deflection angles at which the number of turns of the second cosine excitation coil 22 is maximized are 0 degrees and 180 degrees.

The second detection coil 23 is disposed at a position facing the second sine excitation coil 21 and the second cosine excitation coil 22 in the axial direction of the rotor 2 inside the first detection coil 13. The second detection coil 23 is formed in a shape in which an outward coil 23A and a backward coil 23B are linked. Here, as illustrated in FIG. 2, a straight line P" parallel to the straight line P is assumed on a plane in which the outward coil 23A is routed. The outward coil 23A is formed in a shape in which the conductor is spirally routed in each of the two sections obtained by dividing the annular region into two by the straight line P". The windings wound around the two semi-annular regions are connected to each other. The winding direction of the winding wound around one semi-annular region is set to be opposite to the winding direction of the winding wound around the other semi-annular region. The same applies to the backward coil 23B, but the outward coil 23A and the backward coil 23B are disposed such that the winding directions of the windings opposite in the axial direction of the rotation axis C are different.

The second transmission antenna coil 24 is a winding (coil) for returning the AC signal generated in the second detection coil 23 to the stator 3 side, and is provided at the rotor 2. The second transmission antenna coil 24 has a closed circuit with both ends thereof connected to both ends of the second detection coil 23 to form. The second transmission antenna coil 24 illustrated in FIG. 2 is formed in a shape in which the conductor is routed so as to spiral around the rotation axis C of the rotor 2 inside the second detection coil 23.

The second reception antenna coil 25 is provided at the stator 3 and is disposed at a position facing the second transmission antenna coil 24 in the axial direction of the rotor 2. The second reception antenna coil 25 illustrated in FIG. 3 is formed in a shape in which the conductor is routed so as to spiral around the rotation axis C of the rotor 2 inside the second sine excitation coil 21. The AC signal transmitted to the second reception antenna coil 25 is input to the signal processing circuit 6 and used for calculating the rotation angle of the rotor 2 with respect to the stator 3.

The signal processing circuit 6 has a function of calculating a rotation angle (absolute angle) of the rotor 2 with respect to the stator 3 based on the AC signal transmitted to the first reception antenna coil 15 and the AC signal transmitted to the second reception antenna coil 25. The former AC signal is a signal transmitted via the coils 11 to 13 having an axial double angle of nX, and the latter AC signal is a signal transmitted via the coils 21 to 23 having an axial double angle of 1X. By using these AC signals in combination, it is possible to increase the angular resolution while identifying the absolute angle.

[B. Action and Effect]

(1) In the resolver 1, as illustrated in FIG. 2, a first output coil 13 has an annular magnetic pole group in which a plurality of magnetic poles is disposed adjacent to each other in the circumferential direction at the facing face at which the rotor 2 and the stator 3 face each other. As illustrated in FIG. 4, the first sine excitation coil 11 and the first cosine excitation coil 12 are alternately disposed adjacent to each other in the circumferential direction at the facing face at which the rotor 2 and the stator 3 face each other. In this way, by disposing the first excitation coils 11, 12 on the identical plane, the distance of the first detection coil 13 to each of the first excitation coils 11, 12 can be made uniform, and the signal intensity can be equalized. Accordingly, angle detection accuracy of the resolver 1 can be improved.

In the resolver 1, the circumferential intervals between the magnetic poles included in the first excitation coils 11, 12 and the first detection coil 13 are set to be identical. For example, the angle E corresponding to the width of the magnetic pole illustrated in FIG. 6 is identical to the angle E in FIG. 8. As described above, by equalizing the widths (widths in the circumferential direction) of the magnetic poles of the first excitation coils 11, 12 and the first detection coil 13, the magnetic flux generated by the first excitation coils 11, 12 can efficiently act on the first detection coil 13. That is, it is possible to increase the induced voltage and the excitation current of the first detection coil 13, and it is easy to increase the peak of the output signal to acquire a signal waveform having a desired shape. Therefore, the angle error can be reduced with a simple configuration, and the detection performance of the rotation angle can be improved.

In the resolver 1, the areas of the magnetic poles included in first excitation coils 11, 12 and first detection coil 13 are equal to each other. For example, the radial dimension D of the magnetic pole illustrated in FIG. 6 has the identical value as the dimension D in FIG. 8. The magnetic pole shapes of the first sine excitation coil 11 and the first cosine excitation coil 12 illustrated in FIG. 6 match the magnetic pole shape of the first detection coil 13 illustrated in FIG. 8. Thus, the magnetic flux generated by the first excitation coils 11, 12 can most efficiently act on the first detection coil 13. Therefore, the detection performance of the rotation angle can be further improved with a simple configuration.

(2) In the resolver 1, the first sine excitation coil 11 and the first cosine excitation coil 12 are disposed in the partial annular region 65 as illustrated in FIG. 5, and at least part of the first sine excitation coil 11 and the first cosine excitation coil 12 is configured in a corrugated coil. With such a structure, for example, the outward coil 11A and the backward coil 11B can be formed in the identical layer. In addition, the first sine excitation coil 11 and the first cosine excitation coil 12 can be formed in the identical layer.

Therefore, the variation in the signal intensity transmitted from the first excitation coils 11, 12 to the first detection coil 13 can be suppressed, and the detection performance can be improved. In addition, the structure of the first excitation coils 11, 12 can be simplified, and the manufacturing cost can be reduced. Furthermore, by stacking the first excitation coils 11, 12 which are made lighter and thinner, the signal intensity can be increased, and the detection performance can be further improved.

(3) Each of the first sine excitation coil 11 and the first cosine excitation coil 12 has a structure in which a pair of comb-shaped closed coils connected to each other is disposed so as not to overlap each other in the partial annular region 65. For example, the first sine excitation coil 11 has a structure in which the outward coil 11A and the backward coil 11B are connected so as not to overlap each other in the partial annular region 65. The outward coil 12A and the backward coil 12B of the first cosine excitation coil 12 are also connected so as not to overlap each other in the partial annular region 65.

The first excitation coils 11, 12 include a first comb-shaped closed coil formed in an inward tooth comb shape and a second comb-shaped closed coil formed in an outward tooth comb shape. For example, the first sine excitation coil 11 is formed in a shape in which the outward coil 11A having a shape in which the conductor is routed so as to form an outline of a comb having teeth extending from an arc of the outer circle 62 toward an arc of the inner circle 61 and the backward coil 11B having a shape in which the conductor is disposed so as to form an outline of a comb having teeth extending from an arc of the inner circle 61 toward an arc of the outer circle 62 are linked.

In this manner, by combining the inward teeth and the outward teeth, the magnetic pole pair (N pole and S pole) can be adjacent to each other in the circumferential direction. As a result, the distances between the magnetic poles and the rotation axis C of the rotor 2 can be made uniform, and the signal intensities can be made uniform. Accordingly, angle detection accuracy of the resolver 1 can be improved.

(4) As illustrated in FIG. 3, the first sine excitation coil 11 and the first cosine excitation coil 12 are alternately disposed adjacent to each other in respective regions obtained by equally dividing the facing face by straight lines passing through the rotation axis C of the rotor 2 into an even number at the facing face at which the rotor 2 and the stator 3 face each other. As a result, the number of the first sine excitation coils 11 and the number of the first cosine excitation coils 12 are identical, and the signal intensities emitted from the respective coils can be equalized. Accordingly, angle detection accuracy of the resolver 1 can be improved.

(5) In the resolver 1, the sine coil 11 and the cosine coil 12 includes the identical number of rotationally symmetric coils in which the directions of the magnetic fluxes caused by the excitation are different from each other. Accordingly, the magnetic flux differences due to the coil shapes (comb directions) in the identical phase can be averaged, and the angle detection accuracy of the resolver 1 can be further improved.

(6) In the first excitation coils 11, 12 of the resolver 1, at least one of the gaps between the plurality of coils whose adjacent coils have each gap is wider than the other gaps. In addition, positions of a start end and a terminal end of one of the adjacent coils having the wider gap are different from those of a start end and a terminal end of the other of the adjacent coils in the electrical angle by N cycles±90 degrees. Thus, the distribution of the magnetic flux generated on the first excitation coils 11, 12 side can be optimized, and an appropriate output signal can be induced on the first detection coil 13 side. Therefore, the detection performance of the rotation angle can be further improved.

Further, by making at least one gap wider than the other gaps, the lead wire extending from the inner peripheral side to the outer peripheral side of the first excitation coils 11, 12 can pass through the one gap. That is, it is easy to route the conductor in the identical plane, and the structures of the first excitation coils 11, 12 can be simplified.

(7) As illustrated in FIG. 4, the first sine excitation coil 11 and the first cosine excitation coil 12 are routed so as to form a rotationally symmetric shape with respect to the rotation axis C of the rotor 2. With such a configuration, the distribution of the signal intensity can be optimized in the circumferential direction. Accordingly, angle detection accuracy of the resolver 1 can be improved.

(8) In the resolver 1, at least three sets of the first sine excitation coil 11 and the first cosine excitation coil 12 are provided. For example, the number of sets of the first sine excitation coil 11 and the first cosine excitation coil 12 illustrated in FIG. 4 is four. In this way, by providing three or more pairs of the sine coil and the cosine coil, the robustness of the resolver 1 as a detector can be improved, and the detection performance of the rotation angle can be further improved.

By setting the number of sets of the first sine excitation coil 11 and the first cosine excitation coil 12 to an even number, the number of the first sine excitation coils 11 and the number of the first cosine excitation coils 12 can be equalized in the left half face and the right half face in the annular region where the first excitation coils 11, 12 are disposed in FIG. 4, for example. Therefore, the balance of the magnetic field distribution between the left half face and the right half face can be easily maintained well, and the detection performance of the rotation angle can be further improved.

(9) As illustrated in FIG. 6, the areas of adjacent magnetic poles included in the outward coil 11A and the backward coil 11B of the first sine excitation coil 11 are identical. Similarly, the areas of adjacent magnetic poles included in the outward coil 12A and the backward coil 12B of the first cosine excitation coil 12 are identical. Furthermore, the area of the magnetic pole of the first sine excitation coil 11 is identical to the area of the magnetic pole of the first cosine excitation coil 12. With such a configuration, the sizes of the regions where the magnetic fluxes generated on the first excitation coils 11, 12 exist can be equalized, the sizes of the regions where the magnetic fluxes act on the first detection coil 13 can be equalized, and the sizes of these two types of regions can be equalized. Accordingly, angle detection accuracy of the resolver 1 can be improved.

2. Second Embodiment

Figure 10:
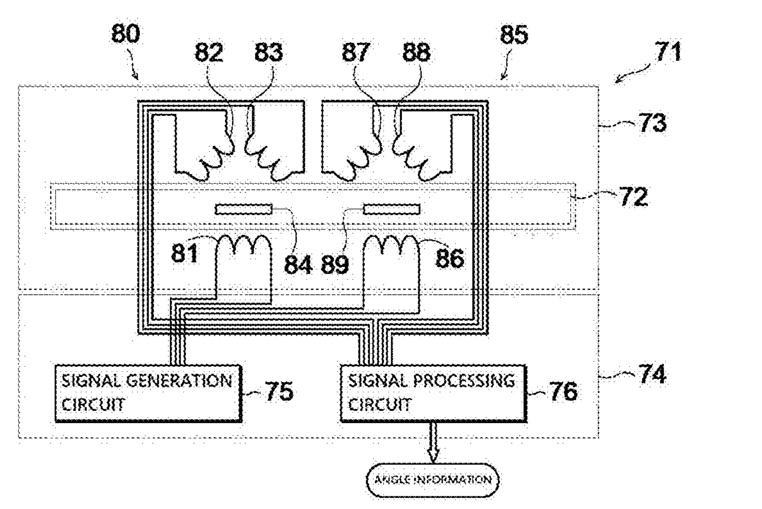
FIG. 10 is a schematic diagram illustrating a structure of a resolver according to the second embodiment.

FIG. 10 is a schematic view illustrating a structure of a resolver 71 according to the second embodiment. The resolver 71 is a single-phase excitation two-phase output resolver 71, and is an inductive resolver (inductive sensor) that receives the AC signal and detects the rotation angle from the amplitude-modulated signal. The resolver 71 includes a rotor 72 (rotor), a stator 73 (stator), and a control device 74. The rotor 72 is a disk-shaped member rotatably supported by the stator 73. The stator 73 is a disk-shaped member fixed to a casing (not illustrated). The stator 73 is provided with excitation coils 81 and 86 and detection coils 82, 83, 87, and 88. On the other hand, the rotor 72 is not provided with a coil, but is provided with conductors 84 and 89.

The control device 74 calculates and outputs a rotation angle of the rotor 72 with respect to the stator 73. The control device 74 incorporates a signal generation circuit 75 that generates an AC signal supplied to the excitation coils 81 and 86, and a signal processing circuit 76 that outputs angle information corresponding to a rotation angle based on signals returned from the detection coils 82, 83, 87, and 88. The AC signal generated by the signal generation circuit 75 is transmitted to the excitation coils 81 and 86, and a predetermined magnetic field is formed in the stator 73. In response to this, eddy currents flow inside the conductors 84 and 89 of the rotor 72, a magnetic field (diamagnetic field) that cancels the magnetic field of the stator 73 is generated, and the magnetic field is shielded. The positions of the conductors 84 and 89 of the rotor 72 change according to the rotation angle. Therefore, a signal amplitude-modulated according to the rotation angle is returned to the detection coils 82, 83, 87, and 88 of the stator 73. This signal is input to the signal processing circuit 6.

The rotor 72 and the stator 73 of the resolver 71 illustrated in FIG. 10 are provided with a first coil group 80 and a second coil group 85. The first coil group 80 is a coil group including an excitation coil and a detection coil having an axial double angle of nX. On the other hand, the second coil group 85 is a coil group including an excitation coil and a detection coil having an axial double angle of 1X. The first coil group 80 and the second coil group 85 are provided at different positions in the radial direction.

The excitation coils 81 and 86 (first excitation coil 81, second excitation coil 86) are coils that generate an axial magnetic field between the first excitation coil 81 and the second excitation coil 86. The conductors 84 and 89 (first conductor 84, second conductor 89), of the rotor 72, facing the stator 73 in the axial direction receive the magnetic fields of the excitation coils 81 and 86, and generate eddy currents therein to generate a diamagnetic field that cancels the magnetic fields of the excitation coils 81 and 86. For this reason, the conductors 84 and 89 shield part of the magnetic fields of the excitation coils 81 and 86. For example, an AC signal having a predetermined amplitude is input to the excitation coils 81 and 86. The amplitude of the AC signal input to the excitation coils 81 and 86 can be changed by an instruction by the control device 74. Here, the voltage value of the AC signal input to the excitation coils 81 and 86 is expressed as "$\sin\omega_{ct}$". $\omega_{ct}$ is an angular velocity of the AC signal.

The detection coils 82, 83, 87, and 88 detect the magnetic fields of the excitation coils 81 and 86. Since the conductors 84 and 89, of the rotor 72, facing each other in the axial direction move in the circumferential direction with the rotation of the rotor 72, a portion where the conductors 84 and 89 shield the magnetic fields of the excitation coils 81 and 86 change according to the rotor angle. Therefore, the magnetic fields detected by the detection coils 82, 83, 87, and 88 also change according to the rotor angle.

The detection coils 82 and 83 of the first coil group 80 include a first sine detection coil 82 and a first cosine detection coil 83. Similarly, the detection coils 87 and 88 of the second coil group 85 include a second sine detection coil 87 and a second cosine detection coil 88. The first sine detection coil 82 and the second sine detection coil 87 detect the sine of the rotor angle, and the first cosine detection coil 83 and the second cosine detection coil 88 detect the cosine of the rotor angle.

The voltage value of the AC signal obtained by the first sine detection coil 82 whose axial double angle is nX is expressed as "sin (ne) $\sin\omega_{ct}$", and the voltage value of the AC signal obtained by the first cosine detection coil 83 is expressed as "$\cos(n\theta)\cdot\sin\omega_{ct}$" where the rotor angle is 0. Similarly, the voltage value of the AC signal obtained by the second sine detection coil 87 whose axial double angle is 1× is expressed as "$\sin\theta\cdot\sin\omega_{ct}$", and the voltage value of the AC signal obtained by the second cosine detection coil 88 is expressed as "$\cos\theta\cdot\sin\omega_{ct}$". As described above, since the amplitude of the modulated wave obtained by each of the detection coils 82, 83, 87, and 88 changes according to the change in rotor angle, the rotor angle θ can be identified based on the amplitude. A signal detected by each of the detection coils 82, 83, 87, and 88 is input to the control device 74.

Figure 11:
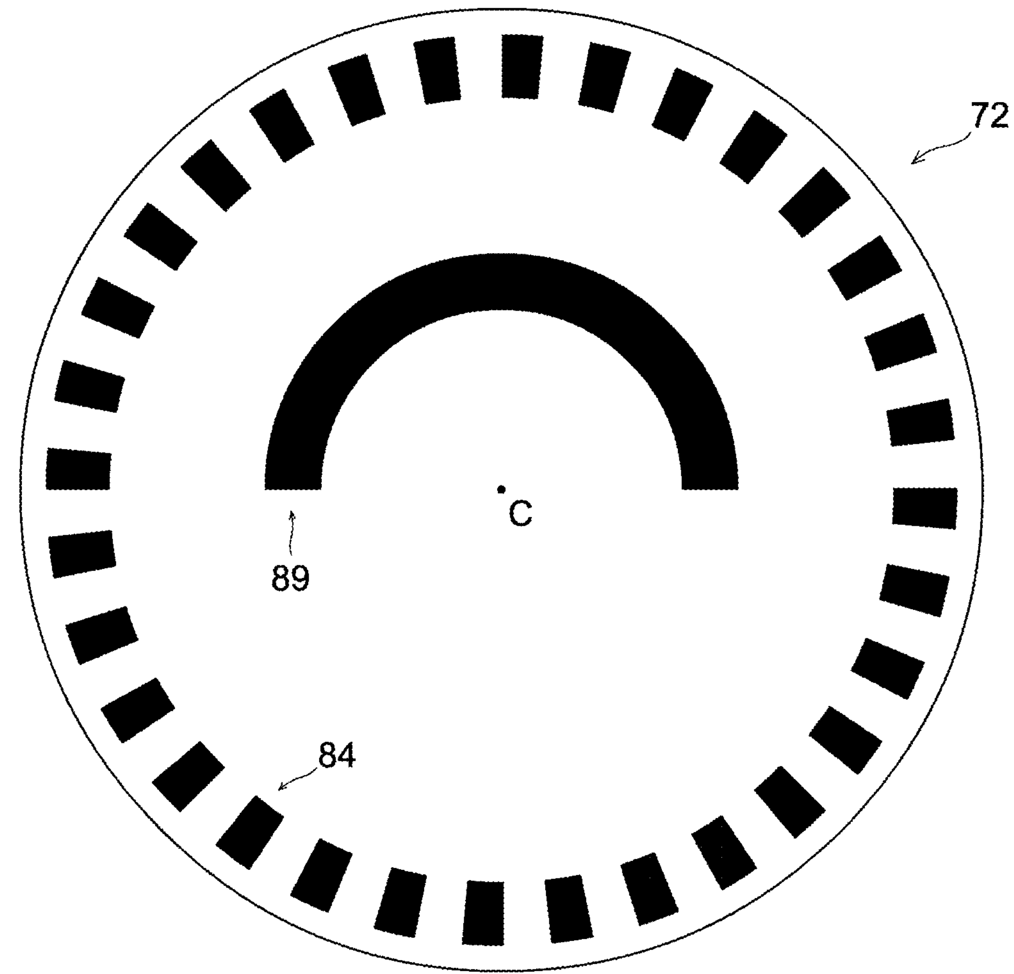
FIG. 11 is a front view illustrating a structure of a rotor of the resolver illustrated in FIG. 10.

FIG. 11 is a diagram illustrating a layout example of the conductors 84 and 89 provided at the rotor 72. The conductors 84 and 89 are formed in shapes in which areas affected by the magnetic fields generated in the excitation coils 81 and 86 change according to the rotation angle of the rotor 72. Specifically, it is formed in a shape (shape in which disk pieces are removed every two disk pieces, and the remaining disk piece is also disposed every two disk pieces) in which the circular ring is divided into many pieces in the circumferential direction and the divided disk pieces are alternately removed along the circumferential direction. The first conductor 84 illustrated in FIG. 11 is a layout example in a case where the axial double angle is 32×. The first conductor 84 has a layout in which annular pieces of the circular ring equally divided into 64 pieces are removed every two pieces and is dispersedly disposed at 32 places in total on the resin plate. In addition, since the axial double angle of the second conductor 89 illustrated in FIG. 11 is 1×, the second conductor has a semicircular ring shape obtained by dividing the ring shape into two in the circumferential direction. Note that the shape of each of the conductors 84 and 89 may not be the "filled shape" as illustrated in FIG. 11, and may be, for example, a "closed ring shape enclosing only the outer periphery".

Figure 12:
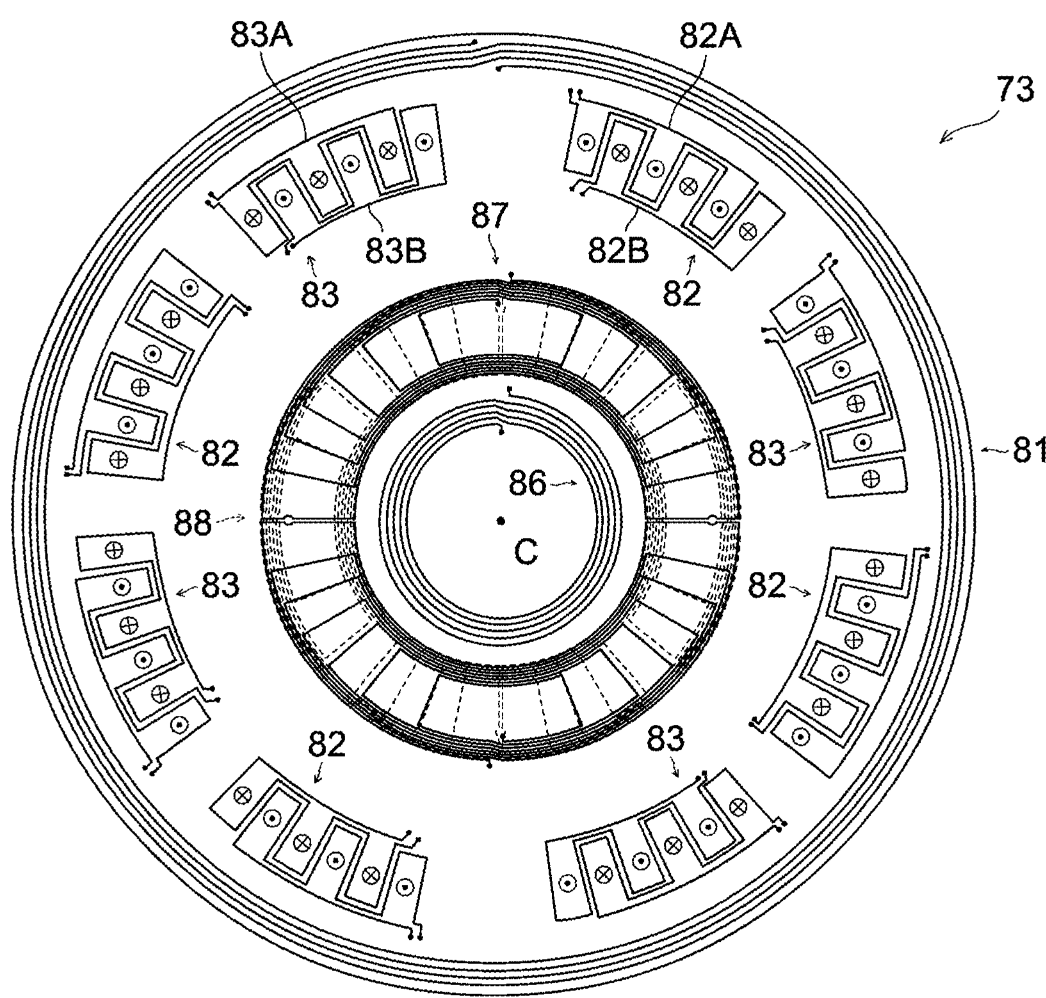
FIG. 12 is a front view illustrating a structure of a stator of the resolver illustrated in FIG. 10.

FIG. 12 is a diagram illustrating a layout example of the first excitation coil 81, the first sine detection coil 82, the first cosine detection coil 83, the second excitation coil 86, the second sine detection coil 87, and the second cosine detection coil 88 provided at the stator 73. Here, the first excitation coil 81 is routed in a shape in which it runs around the outer periphery a plurality of times at the face facing the disk-shaped rotor 72. On the other hand, the second excitation coil 86 is routed in a shape in which it runs around the inner periphery close to the rotation axis C a plurality of times at the facing face. These excitation coils 81 and 86 are not coils dedicated to the first coil group 80 and the second coil group 85, respectively, and collectively function as one excitation coil. In a region outside the first excitation coil 81 and a region inside the second excitation coil 86, magnetic fields that cancel each other are formed. On the other hand, magnetic fields that strengthen each other are formed in a region inside the first excitation coil 81 and outside the second excitation coil 86. As described above, the magnetic fields generated by the two excitation coils 81 and 86 are used in both the first coil group 80 and the second coil group 85. The detection coils 82 and 83 of the first coil group 80 are disposed on the outer peripheral side in the annular region surrounded by the first excitation coil 81 and the second excitation coil 86. On the other hand, the detection coils 87 and 88 of the second coil group 85 are disposed on the inner peripheral side of the annular region.

As illustrated in FIG. 12, the first sine detection coil 82 and the first cosine detection coil 83 are disposed so as to be alternately adjacent to each other in the circumferential direction at the facing face, of the stator 73, facing the rotor 72. This layout corresponds to the layout of the first sine excitation coil 11 and the first cosine excitation coil 12 in FIG. 4, and with the first sine detection coil 82 and the first cosine detection coil 83 adjacent to each other as one set, four sets are disposed to form a rotationally symmetric shape.

The first sine detection coil 82 is formed in a shape in which an outward coil 82A for generating one of the magnetic pole pair (N pole and S pole) and a backward coil 82B for generating the other of the magnetic pole pair are linked. The outward coil 82A and the backward coil 82B are disposed on the identical plane so as not to overlap each other. The same applies to the first cosine detection coil 83, and the first cosine detection coil 83 is formed in a shape in which an outward coil 83A for generating one of the magnetic pole pair and a backward coil 83B for generating the other of the magnetic pole pair are linked. The outward coil 83A and the backward coil 83B are disposed on the identical plane so as not to overlap each other.

Focusing on one of the four first sine detection coils 82 illustrated in FIG. 12, the intervals in the circumferential direction between the magnetic poles included in the outward coil 83A and the backward coil 83B are identical, and the area per pole of the magnetic pole pair is also identical. Similarly, in one first cosine detection coil 83, the intervals in the circumferential direction between the magnetic poles included in the outward coil 83A and the backward coil 83B are identical, and the area per pole of the magnetic pole pair is also identical. The circumferential interval between the magnetic poles in the first sine detection coil 82 is identical to the circumferential interval between the magnetic poles in the first cosine detection coil 83. Furthermore, the area per pole of the magnetic pole pair in the first sine detection coil 82 is identical to the area per pole of the magnetic pole pair in the first cosine detection coil 83. The radial dimension of the magnetic pole and the angle corresponding to the width of the magnetic pole with respect to the rotation axis C of the rotor 2 are identical between the adjacent magnetic poles, and are identical in the first sine detection coil 82 and the first cosine detection coil 83.

As illustrated in FIG. 12, the second sine detection coil 87 and the second cosine detection coil 88 are formed such that the number of turns changes according to the rotation angle of the rotor 72. The relationship between the rotation angle and the number of turns is set so as to correspond to, for example, the relationship between the angle and the amplitude in the sine wave. The phase of the rotation angle at which the number of turns of the second sine detection coil 87 is maximized is set to be different by 90 degrees from the phase of the rotation angle at which the number of turns of the second cosine detection coil 88 is maximized.

In the resolver 71 of the second embodiment, as illustrated in FIG. 12, the first sine detection coil 82 and the first cosine detection coil 83 are alternately disposed adjacent to each other in the circumferential direction at the facing face at which the rotor 2 and the stator 3 face each other. As described above, by disposing the detection coils 82 and 83 on the identical plane, the distances of the detection coils 82 and 83 to the first conductor 84 can be made uniform, and the signal intensities can be made uniform. Therefore, the angle detection accuracy of the resolver 1 can be improved, and the similar effect as that of the first embodiment can be obtained.

[3. Modifications]

The above embodiments (the first embodiment and the second embodiment) are merely examples, and do not intend to exclude application of various modifications and techniques which are not explicitly described in the above embodiments. Each configuration of the above embodiments can be variously modified and implemented without departing from the spirit thereof. Furthermore, selection can be made as necessary, or a combination can be made as appropriate.

Figure 13:
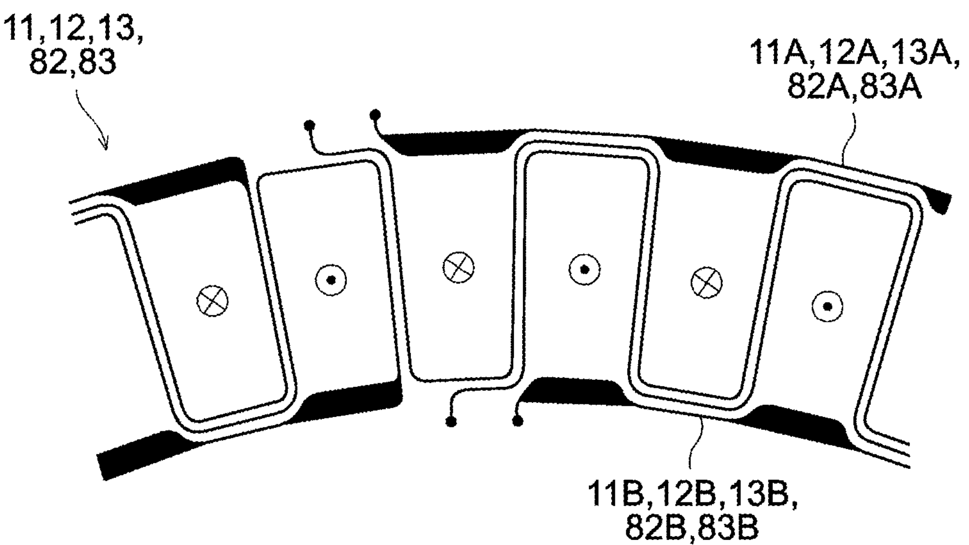
FIG. 13 is a wiring diagram illustrating a coil structure as a modification.
Figure 14:
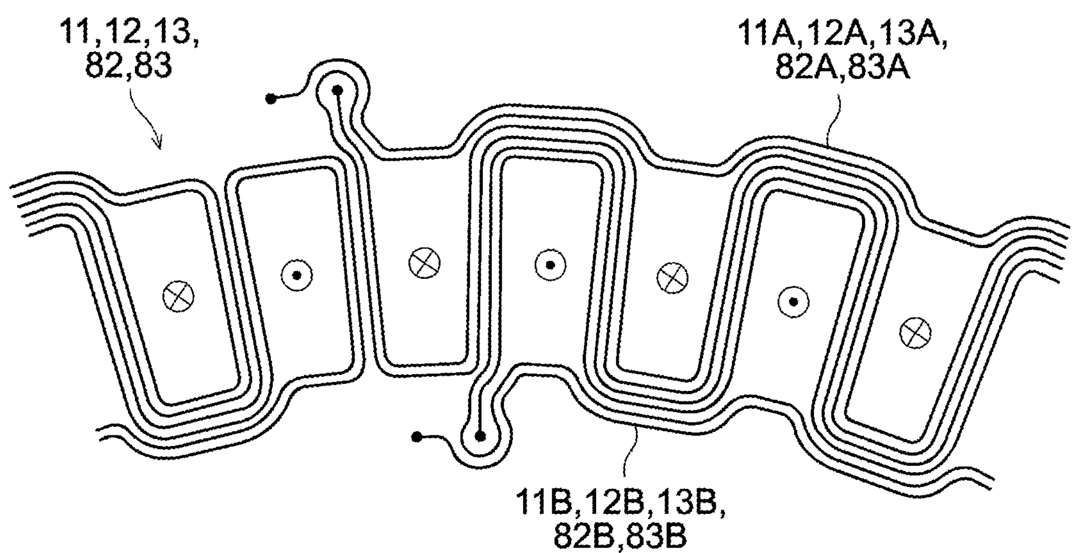
FIG. 14 is a wiring diagram illustrating a coil structure as a modification.

For example, in the above embodiment, the comb-shaped closed coil having the shape as illustrated in FIGS. 6 and 8 is exemplified, but the specific coil shape is not limited thereto. As illustrated in FIG. 13, the thickness of the conductor may be partially changed. With such a configuration, the magnetic pole area can be easily adjusted with a simple configuration. In the above embodiment, the coil in which the conductor runs around each magnetic pole once is exemplified, but a coil in which the conductor runs around a plurality of times may be used. The coil illustrated in FIG. 14 is a coil having a shape in which the conductor runs around each magnetic pole twice. By increasing the number of turns of the conductor, the magnetic flux density can be increased, and the detection performance of the rotation angle can be improved.

Figure 15:
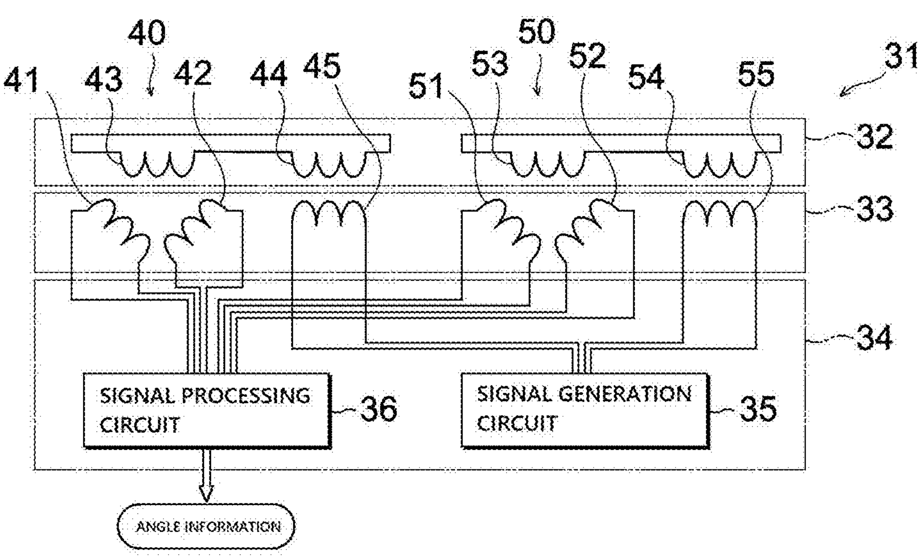
FIG. 15 is a schematic diagram illustrating a structure of a resolver as a modification.

Further, in the above embodiment, the two-phase excitation single-phase output resolver 1 is exemplified, but a similar structure may be applied to the single-phase excitation two-phase output resolver 31 as illustrated in FIG. 15. The resolver 31 is provided with a rotor 32, a stator 33, and a control device 34. The control device 34 incorporates a signal generation circuit 35 and a signal processing circuit 36. The rotor 32 and the stator 33 of the resolver 31 are provided with a first coil group 40 and a second coil group 50.

The first coil group 40 includes a first sine detection coil 41, a first cosine detection coil 42, a first excitation coil 43, a first reception antenna coil 44, and a first transmission antenna coil 45. Similarly, the second coil group 50 includes a second sine detection coil 51, a second cosine detection coil 52, a second excitation coil 53, a second reception antenna coil 54, and a second transmission antenna coil 55. Among the coils included in the coil groups 40 and 50, the axial double angles of the first sine detection coil 41, the first cosine detection coil 42, and the first excitation coil 43 are set to nX, and the axial double angles of the second sine detection coil 51, the second cosine detection coil 52, and the second excitation coil 53 are set to 1×.

In addition, the first excitation coil 43, the first reception antenna coil 44, the second excitation coil 53, and the second reception antenna coil 54 are provided at the rotor 32. On the other hand, the first sine detection coil 41, the first cosine detection coil 42, the first transmission antenna coil 45, the second sine detection coil 51, the second cosine detection coil 52, and the second transmission antenna coil 55 are provided at the stator 33. The AC signal generated by the signal generation circuit 35 is transmitted to the first transmission antenna coil 45 and the second transmission antenna coil 55, and then transmitted to the first reception antenna coil 44 and the second reception antenna coil 54. The first excitation coil 43 and the second excitation coil 53 are excited by receiving the AC signal. Thereafter, the first sine detection coil 41, the first cosine detection coil 42, the second sine detection coil 51, and the second cosine detection coil 52 output AC signals according to the rotation angle of the rotor 32 with respect to the stator 33, and the signals is transmitted to the signal processing circuit 36.

The signal processing circuit 36 calculates the rotation angle of the rotor 32 with respect to the stator 33 using the AC signal obtained via the coils of the two systems in combination to output the angle information. As described above, even in the single-phase excitation two-phase output type resolver 31, the detection performance of the rotation angle can be improved with a simple configuration. The similar structure as in the above embodiment can be applied not only to the single-phase excitation two-phase output resolver 31 but also to the two-phase excitation two-phase output resolver.

The invention claimed is:

1. A resolver that detects a rotation angle of a rotor with respect to a stator, the resolver comprising:

a sheet-like excitation coil provided at the rotor or the stator; and a sheet-like detection coil provided at the rotor or the stator, wherein one of the excitation coil and the detection coil includes a plurality of sine coils and a plurality of cosine coils that transmit AC signals having phases of an electrical angle different from each other by 90 degrees, the plurality of sine coils and the plurality of cosine coils including a first plurality of magnetic poles, the other of the excitation coil and the detection coil has an annular magnetic pole group in which a second plurality of magnetic poles is disposed adjacent to each other in a circumferential direction at a location at which the rotor and the stator face each other, the plurality of sine coils and the plurality of cosine coils are circumferentially disposed alternately adjacent to each other at the location, and intervals in a circumferential direction between magnetic poles of the first plurality of magnetic poles and magnetic poles of the second plurality of magnetic poles are identical, wherein each of the sine coils and each of the cosine coils are disposed in a partial annular region surrounded by an inner circle and an outer circle around a rotation axis of the rotor and two straight lines passing through the rotation axis at the location, and have a structure in which at least part of the each sine coil and at least part of the each cosine coil are each configured by a corrugated coil, each of the sine coils and each of the cosine coils have a structure in which a pair of comb-shaped closed coils connected to each other is disposed so as not to overlap each other in the partial annular region, the pair of comb-shaped closed coils includes a first comb-shaped closed coil in which a conductor is routed so as to form an outline of a comb having teeth extending from an arc of the outer circle toward an arc of the inner circle, and a second comb-shaped closed coil in which a conductor is routed so as to form an outline of a comb having teeth extending from an arc of the inner circle toward an arc of the outer circle, and the sine coils and the cosine coils are all collectively disposed in a same identical plane perpendicular to a rotation axis of the rotor.

2. The resolver according to claim 1, wherein the sine coils and the cosine coils are all disposed at a same distance from the annular magnetic pole group.

3. The resolver according to claim 1, wherein the sine coils and the cosine coils are alternately disposed adjacent to each other in respective regions obtained by equally dividing the facing face by straight lines passing through a rotation axis of the rotor into an even number at the facing face.

4. The resolver according to claim 1, wherein the sine coils and the cosine coils include an identical number of rotationally symmetric coils in which directions of magnetic fluxes caused by excitation are different from each other.

5. The resolver according to claim 1, further comprising a plurality of gaps, each gap being between a corresponding sine coil and a corresponding cosine coil among the plurality of sine coils and the plurality of cosine coils that are circumferentially disposed alternately adjacent to each other;

wherein at least one gap among the plurality of gaps is wider than other gaps among the plurality of gaps, and positions of a start end and a terminal end of one of a sine coil and a cosine coil corresponding to the wider gap are different from positions of a start end and a terminal end of sine coils and cosine coils corresponding to the other gaps in an electrical angle by N cycles±90 degrees, where N is a whole number.

6. The resolver according to claim 1, wherein the sine coils and the cosine coils are routed so as to form a rotationally symmetric shape with respect to a rotation axis of the rotor.

7. The resolver according to claim 1, wherein the excitation coil and the detection coil are both provided at the stator, and the rotor includes a conductor that generates a diamagnetic field in a direction of canceling a magnetic field of the excitation coil with a magnitude according to the rotation angle.

8. The resolver according to claim 1, wherein the excitation coil is disposed at one of the rotor and the stator, and the detection coil is disposed at the other of the rotor and the stator so as to face the excitation coil.

9. A resolver that detects a rotation angle of a rotor with respect to a stator, the resolver comprising:

a sheet-like excitation coil provided at the rotor or the stator; and a sheet-like detection coil provided at the rotor or the stator, wherein one of the excitation coil and the detection coil includes a plurality of sine coils and a plurality of cosine coils that transmit AC signals having phases of an electrical angle different from each other by 90 degrees, the plurality of sine coils and the plurality of cosine coils including a first plurality of magnetic poles, the other of the excitation coil and the detection coil has an annular magnetic pole group in which a second plurality of magnetic poles is disposed adjacent to each other in a circumferential direction at a location at which the rotor and the stator face each other, the plurality of sine coils and the plurality of cosine coils are circumferentially disposed alternately adjacent to each other at the location, and intervals in a circumferential direction between magnetic poles of the first plurality of magnetic poles and magnetic poles of the second plurality of magnetic poles are identical, wherein each of the sine coils and each of the cosine coils are disposed in a partial annular region surrounded by an inner circle and an outer circle around a rotation axis of the rotor and two straight lines passing through the rotation axis at the location, and have a structure in which at least part of the each sine coil and at least part of the each cosine coil are each configured by a corrugated coil, each of the sine coils and each of the cosine coils have a structure in which a pair of comb-shaped closed coils connected to each other is disposed so as not to overlap each other in the partial annular region, the pair of comb-shaped closed coils includes a first comb-shaped closed coil in which a conductor is routed so as to form an outline of a comb having teeth extending from an arc of the outer circle toward an arc of the inner circle, and a second comb-shaped closed coil in which a conductor is routed so as to form an outline of a comb having teeth extending from an arc of the inner circle toward an arc of the outer circle, and the sine coils and the cosine coils are all disposed at a same distance from the annular magnetic pole group.

10. The resolver according to claim 9, wherein the sine coils and the cosine coils are alternately disposed adjacent to each other in respective regions obtained by equally dividing the facing face by straight lines passing through a rotation axis of the rotor into an even number at the facing face.

11. The resolver according to claim 9 wherein the sine coils and the cosine coils include an identical number of rotationally symmetric coils in which directions of magnetic fluxes caused by excitation are different from each other.

12. The resolver according to claim 9, further comprising a plurality of gaps, each gap being between a corresponding sine coil and a corresponding cosine coil among the plurality of sine coils and the plurality of cosine coils that are circumferentially disposed alternately adjacent to each other;

wherein at least one gap among the plurality of gaps is wider than other gaps among the plurality of gaps, and positions of a start end and a terminal end of one of a sine coil and a cosine coil corresponding to the wider gap are different from positions of a start end and a terminal end of sine coils and cosine coils corresponding to the other gaps in an electrical angle by N cycles±90 degrees, where N is a whole number.

13. The resolver according to claim 9, wherein the sine coils and the cosine coils are routed so as to form a rotationally symmetric shape with respect to a rotation axis of the rotor.

14. The resolver according to claim 9, wherein the excitation coil and the detection coil are both provided at the stator, and the rotor includes a conductor that generates a diamagnetic field in a direction of canceling a magnetic field of the excitation coil with a magnitude according to the rotation angle.

15. The resolver according to claim 9, wherein the excitation coil is disposed at one of the rotor and the stator, and the detection coil is disposed at the other of the rotor and the stator so as to face the excitation coil.

* * * * *